United States Patent
Grabbe et al.

(10) Patent No.: US 9,889,466 B2
(45) Date of Patent: Feb. 13, 2018

(54) METHOD FOR COATING A METAL OR PLASTIC SUBSTRATE, COATING THAT CAN BE OBTAINED THEREFROM, AND COATED SUBSTRATE

(75) Inventors: Michael Grabbe, Senden (DE); Bernhard Lettmann, Drensteinfurt (DE); Günther Ott, Münster (DE)

(73) Assignee: BASF Coatings GmbH, Munster (DE)

( * ) Notice: Subject to any disclaimer, the term of this patent is extended or adjusted under 35 U.S.C. 154(b) by 482 days.

(21) Appl. No.: 13/636,023

(22) PCT Filed: Mar. 18, 2011

(86) PCT No.: PCT/EP2011/054112
§ 371 (c)(1),
(2), (4) Date: Nov. 2, 2012

(87) PCT Pub. No.: WO2011/113929
PCT Pub. Date: Sep. 22, 2011

(65) Prior Publication Data
US 2013/0122307 A1    May 16, 2013

(30) Foreign Application Priority Data
Mar. 19, 2010 (DE) .................. 10 2010 012 047

(51) Int. Cl.
| | | |
|---|---|---|
| *B05D 1/36* | (2006.01) | |
| *B05D 3/02* | (2006.01) | |
| *B05D 7/14* | (2006.01) | |
| *B05D 7/00* | (2006.01) | |
| *C08G 18/08* | (2006.01) | |
| *C08G 18/58* | (2006.01) | |
| *C09D 5/08* | (2006.01) | |
| *C09D 5/44* | (2006.01) | |

(52) U.S. Cl.
CPC ............. *B05D 3/0254* (2013.01); *B05D 1/36* (2013.01); *B05D 7/14* (2013.01); *B05D 7/542* (2013.01); *C08G 18/0814* (2013.01); *C08G 18/581* (2013.01); *C09D 5/08* (2013.01); *C09D 5/4438* (2013.01); *B05D 2202/10* (2013.01); *B05D 2202/25* (2013.01); *Y10T 428/31511* (2015.04)

(58) Field of Classification Search
CPC ........................................................ B05D 1/36
See application file for complete search history.

(56) References Cited

U.S. PATENT DOCUMENTS

| | | | | |
|---|---|---|---|---|
| 4,260,720 A * | 4/1981 | Bosso | .................. | C08G 59/18 523/414 |
| 4,322,529 A * | 3/1982 | Kuster | .................. | C09B 69/04 534/693 |
| 4,785,026 A * | 11/1988 | Yeakey | ............... | C08G 18/0876 521/137 |
| 4,830,722 A | 5/1989 | Dobbelstein et al. | | |
| 4,871,807 A | 10/1989 | Staritzbichler et al. | | |
| 5,003,025 A | 3/1991 | Dobbelstein et al. | | |
| 5,236,564 A | 8/1993 | Berg et al. | | |
| 5,977,286 A | 11/1999 | Marten et al. | | |
| 6,413,642 B1 | 7/2002 | Wegner et al. | | |
| 6,503,999 B1 * | 1/2003 | Mitchell | ............ | C08G 18/3825 252/182.26 |
| 2003/0083397 A1* | 5/2003 | Bradford et al. | ............. | 522/173 |
| 2005/0161330 A1* | 7/2005 | Toi et al. | ....................... | 204/484 |
| 2009/0317629 A1* | 12/2009 | Wegner | .................... | C09D 4/00 428/336 |

FOREIGN PATENT DOCUMENTS

| | | |
|---|---|---|
| DE | 3518732 A1 | 11/1986 |
| DE | 3518770 A1 | 11/1986 |
| DE | 3915080 A1 | 11/1990 |
| DE | 19843835 A1 | 3/2000 |
| EP | 0272525 A2 | 6/1988 |
| EP | 0819733 A2 | 1/1998 |
| EP | 0941295 B1 | 11/2003 |
| EP | 1813633 A1 | 8/2007 |
| WO | WO9526373 A1 | 10/1995 |

OTHER PUBLICATIONS

English Translation of International Preliminary Report on Patentability for International Application No. PCT/EP2011/054112 dated Sep. 25, 2012, 5 pages.
English Translation of International Search Report for International Application No. PCT/EP2011/054112 dated Jul. 19, 2011, 2 pages.
Written Opinion for International Application No. PCT/EP2011/054112 dated Jul. 19, 2011, 5 pages.
"Crosslinker for exterior durable powder coatings", Primid XL-522—Primid EMS, May 4, 2017, 1 pgs.
"Paint and Surface Coatings—Theory and Practice, 2nd Edition", eds. R. Lamourne and T. A. Strivens—2nd Edition 1999 Woodhead Publishing Ltd., 3 pgs.

\* cited by examiner

*Primary Examiner* — James Mellott
(74) *Attorney, Agent, or Firm* — Servilla Whitney LLC

(57) ABSTRACT

A method for coating an uncoated or precoated metallic or plastics substrate by (a) applying an aqueous coating composition (W) whose constituents are free or substantially free from blocked isocyanate groups, which comprises an aqueous dispersion of an epoxide-amine adduct, and which comprises either no crosslinking agent or one or more nonblocked polyisocyanate crosslinking agents, to the substrate, (b) optionally applying one or more further coating compositions, and (c) curing the coating composition (W) and, where appropriate, the further coating composition(s) at temperatures of below 90° C.

15 Claims, No Drawings

METHOD FOR COATING A METAL OR PLASTIC SUBSTRATE, COATING THAT CAN BE OBTAINED THEREFROM, AND COATED SUBSTRATE

CROSS REFERENCE TO RELATED APPLICATIONS

This application is a National Phase Application of Patent Application PCT/EP2011/054112 filed on 18 Mar. 2011, which claims priority to DE 10 2010 012 047.2, filed 19 Mar. 2010.

FIELD OF THE INVENTION

The invention relates to a method for coating a metallic or plastics substrate, to the coating obtainable therefrom, and to the coated substrate.

BACKGROUND OF THE INVENTION

Methods for coating metallic substrates are known from the prior art.

DE 39 15 080 A1 describes a method for coating conductive substrates by immersing them into an aqueous electrocoat material which comprises at least one cathodically depositable synthetic resin. After a film has been electrophoretically deposited on the substrate, the deposited coating film is baked. An example of a cathodically depositable synthetic resin that can be used is a cationic, amine-modified epoxy resin. This resin either is self-crosslinking, in which case the amine-modified epoxy resin contains, for example, blocked isocyanate groups, or is externally crosslinking, in which case the aqueous electrocoat material comprises a suitable crosslinker component, such as a blocked polyisocyanate, for example. The coating is baked generally at temperatures from 130 to 200° C.

EP 0 941 295 A1 describes a method for coating substrates, preferably of metal, by cleaning the substrate surface, optionally applying a pretreatment composition, applying a primer, and applying a topcoat by spraying, dipping, knifing, rolling or spreading, the primer comprising an amine-modified epoxy resin. As in DE 39 15 080 A1, the amine-modified epoxy resin either may be self-crosslinking, in which case the amine-modified epoxy resin comprises, for example, blocked isocyanate groups, or is externally crosslinking, in which case the primer additionally comprises a suitable crosslinker component, such as a blocked polyisocyanate, for example. The coating is baked generally at temperatures from 90 to 300° C.

EP 0 272 525 A2 describes the preparation of partial condensation products from a film-forming polycarboxyl compound and an epoxy resin-amine adduct. The condensation products are combined for the formulation of water-thinable coatings with crosslinking components such as phenolic, melamine, urea, benzoguanamine or glycoluril resins. The coating films are oven-drying.

WO 95/26373 describes aqueous coating compositions for can or coil coatings, more particularly for the interior coating of beverage cans, the compositions comprising an epoxide-amine adduct and also a carboxyl-bearing vinyl polymer. There may be crosslinking agents present such as amino resins, phenolic resins, urea resins or blocked isocyanates. The coatings are cured typically at 200-300° C.

One of the key objectives in the coating of metallic substrates is to achieve effective corrosion control. This is the case, for example, both for automotive OEM finishing and for automotive refinish. In automotive OEM finishing, sufficient corrosion control may typically be achieved through passivation of the substrate, application and baking of appropriate corrosion-control coatings, such as electrocoats and primers, for example, and also further coating materials.

Automotive refinish differs from automotive OEM finishing essentially first in that the paint finish is not produced on the production line under corresponding industrial application conditions, and second in that it has to be carried out on a completed automobile with all of its components. Automotive refinish takes place in general with skilled-labor methods, by manual spray application, under drying and curing conditions of typically not more than 80° C. Higher temperatures, even if occurring only locally, may give rise to damage due to deformation or melting of plastics components, deformation of the tires, or irreversible defects caused to the electrics and electronics of the vehicles. It follows from this that the coating materials required for refinish are different than for OEM. In particular, the coating materials must be suitable for spray application and must cure completely, or substantially completely, even at temperatures of below 90° C. With the known coating materials as described above, this is not possible, and hence they are not suitable for automotive refinish.

Corrosion control therefore poses a particular challenge in the case of automotive refinish. Sufficient corrosion-control properties are presently achievable in refinish by using what are called acid primers (wash primers) based on polyvinyl butyral. The fraction of volatile organic constituents (VOC) in these wash primers, however, at about 700 g/L, is very high, and this is extremely undesirable from the standpoint of environmental protection and against the background of increasingly stringent legislation. The high VOC level is based on a high fraction of organic solvents in the known corrosion-control wash primers. Effective corrosion control is also achievable with chromate-containing primers. Considerations of environmental protection, however, have rendered such primers anachronistic. But with the existing modern aqueous primers for the refinish sector, adequate corrosion control is impossible to achieve.

The problem addressed by the present invention was therefore that of providing a method for coating metallic substrates that is suitable for automotive refinish, managing as far as possible without chromates and with minimal amounts of organic solvents, and yet at the same time allowing effective corrosion control to be achieved.

The resultant coatings ought, moreover, to exhibit effective adhesion to the substrate, and good intercoat adhesion with other coating films, and to contribute to high stone chip resistance on the part of the paint finish.

The method shall as far as possible also be suitable for the finishing of plastics substrates accordingly.

SUMMARY OF THE INVENTION

This problem is solved, surprisingly, through the subject matter of the independent patent claims. Preferred embodiments of the invention are apparent from the subject matter of the dependent patent claims.

A method has been found for coating an uncoated or precoated metallic or plastics substrate by
(a) applying an aqueous coating composition (W) whose constituents are free or substantially free from blocked isocyanate groups, which comprises an aqueous dispersion of an epoxide-amine adduct, and which comprises either no crosslinking agent or one or more nonblocked polyisocyanate crosslinking agents, to the substrate, (b) optionally applying one or more further coating compositions, and (c) curing the coating composition (W) and, where appropriate, the further coating composition(s), wherein said curing takes place at temperatures of below 90° C.

DETAILED DESCRIPTION OF AN EMBODIMENT OF THE INVENTION

The substrate is preferably a metallic substrate.

The metallic substrate may comprise one or more metals of any kind, such as, for example, aluminum, steel, galvanized steel, alloys of aluminum, zinc, iron, magnesium, copper, tin, silicon, nickel and/or further metals. The metallic substrate is preferably a substrate made of aluminum, of steel or of galvanized steel.

Plastics substrates contemplated include all plastics to which it is known that a paint finish can be imparted, such as, for example, PC (polycarbonate), SMC (sheet molding compounds), GRP (glass fiber reinforced plastic), PBT (polybutylene terephthalate), ABS (acrylonitrile-butadiene-styrene), PUR (polyurethane), CRP (carbon fiber reinforced plastic), or PET (polyethylene terephthalate). In the case of plastics to which it is very difficult to impart a paint finish, such as PP/EPDM (polypropylene/ethylene-propylene-diene rubber), for example, a corresponding adhesion primer for plastics is typically applied beforehand.

The surface of the metallic or plastics substrate may have been pretreated. Pretreatment methods contemplated include all of the customary surface pretreatment methods for metallic or plastics substrates, such as, for example, their cleaning by wiping, abrading, polishing, brushing, blasting, thermal flame descaling, pickling, cleaning with solvents and/or aqueous cleaners, and also pretreatment by activating (with titanium phosphate or with other chemical or mechanical agents, for example), eloxing, pickling of aluminum surfaces, phosphating, chromating, application of other inorganic conversion coats, and/or afterpassivation.

The metallic or plastics substrate may have been pre-coated, with a single-layer or multilayer coating, for example. In particular, the metallic or plastics substrate may bear an existing paint finish. The precoating, more particularly the existing paint finish, may comprise, for example, an electrocoat, primer, filler, basecoat and/or clearcoat. The existing paint finish may have defect sites at which one or more layers of the existing paint finish are no longer present, or no longer completely present. If the metallic or plastics substrate carries an existing paint finish, then the method described is more particularly a refinish method.

The metallic or plastics substrate may be, for example, a metal strip (coil), a vehicle body or part of a vehicle body, or a household appliance or part of a household appliance. The metallic or plastics substrate is preferably part of an automobile body.

Applied atop the metallic or plastics substrate is an aqueous coating composition (W) whose constituents are free or substantially free from blocked isocyanate groups, said composition comprising an aqueous dispersion of an epoxide-amine adduct, and comprising either no crosslinking agent or a nonblocked polyisocyanate crosslinking agent.

The coating composition (W) is aqueous. This means that the coating composition (W) comprises water as solvent and may include organic solvents only in a minor fraction relative to the water. The fraction of organic solvents is preferably less than 30%, more preferably less than 20%, and very preferably less than 15%, by weight, based in each case on the overall aqueous coating composition (W).

The aqueous coating composition (W) advantageously has a low volatile organic compounds (VOC) content. The VOC value of the coating composition is calculated using the following formula:

$$VOC(g/L) = (mf-mw)/(vg-vw)$$

mf=mass of volatiles [g]
mw=mass of water [g]
vg=total volume of coating composition [L]
vw=volume of water [L].

The boundary between volatile and nonvolatile for an organic compound is defined as follows: An organic compound which at 293.15 K (20° C.) or under the particular use conditions has a vapor pressure of 0.01 kPa or more. The method for determining the VOC value is described comprehensively in EN ISO 11890:2007.

The aqueous coating composition (W) has a VOC value of preferably below 450 g/L, more preferably below 350 g/L, even more preferably below 300 g/L, very preferably below 250 g/L.

The constituents of the aqueous coating composition (W) are free or substantially free from blocked isocyanate groups. By "substantially free" is meant that the few blocked isocyanate groups that may be present are present in such a small fraction that no notable crosslinking of the constituents of the aqueous coating composition (W) via the few blocked isocyanate groups that may be present can take place. The constituents of the aqueous coating composition (W) comprehend all the constituents, particularly binders, crosslinkers, and other adjuvants. Accordingly, in particular, the binder or binders and also the crosslinker or crosslinkers that may be present in the aqueous coating composition (W) are also free or substantially free from blocked isocyanate groups.

Blocked isocyanate groups are understood, as is generally customary, to be isocyanate groups which have been reacted with a blocking agent, making the resultant blocked isocyanate groups stable at room temperature with respect, for example, to hydroxyl groups and amino groups, but such that the blocked groups react at elevated temperatures of about 90-300° C., since on baking within this temperature range the blocking agent is eliminated and the isocyanate group is available for reaction again. Dimerized isocyanate groups (uretdiones) and trimerized isocyanate groups (isocyanurates) are not included among blocked isocyanate groups.

The aqueous coating composition (W) comprises an aqueous dispersion of an epoxide-amine adduct as binder. An epoxide-amine adduct is a reaction product of at least one polyepoxide (P) and at least one amine (N).

By polyepoxide (P) are meant compounds which contain two or more epoxide groups in the molecule. Polyepoxides (P) suitable for preparing the epoxide-amine adducts are, for example Polyepoxides having a number-average molecular weight of 200 to 20,000 g/mol. The number-average molecular weight is determined by GPC.

Polyepoxides having an epoxide equivalent weight of 100 to 10,000 g/eq.

The epoxide equivalent weight of a compound [g/eq] is the ratio of the number-average molecular weight of the compound [g/mol] to the number of epoxide groups per mole of the compound [eq/mol]. The epoxide equivalent weight of a compound indicates that mass of the compound in [g] that on statistical average contains one epoxy group (i.e., one epoxy equivalent).

Further suitable polyepoxides (P) are compounds which are preparable by reacting
(a) a diepoxide compound or a mixture of diepoxide compounds having an epoxide equivalent weight of below 2000 g/eq with
(b) a compound which contains a phenol group or thiol group and which, under the prevailing reaction conditions, reacts monofunctionally with respect to epoxide compounds, or else a mixture of such monofunctionally reacting compounds, where components (a) and (b) are used in a molar ratio of 10:1 to 1:1, preferably 4:1 to 1.5:1, and the reaction of component (a) with component (b) is carried out at 100 to 190° C. in the absence or presence of a catalyst (cf. DE 35 18 770).

Further suitable polyepoxides (P) are compounds which are preparable by a polyaddition of a diepoxide compound and/or a mixture of diepoxide compounds, together where appropriate with a monoepoxide compound, said polyaddition being carried out at 100 to 195° C. in the absence or presence of a catalyst and being initiated by a monofunctionally reacting initiator, which carries alternatively an alcoholic OH group, a phenolic OH group or an SH group, this reaction forming an epoxy resin in which diepoxide compound and initiator are incorporated in a molar ratio of greater than 2:1 to 10:1 (cf. DE 35 18 732).

Polyepoxides which can be used for preparing the particularly preferred polyepoxides (P), or which can be used themselves as polyepoxides (P), are, for example, polyglycidyl ethers of polyphenols that are prepared from polyphenols and epihalohydrins. Polyphenols which can be used with particular preference are, for example, bisphenol A and bisphenol F. Also suitable, furthermore, are 4,4"-di-hydroxybenzophenone, 1,1-bis(4-hydroxyphenyl)ethane, 1,1-bis(4-hydroxyphenyl)-isobutane, 2,2-bis(4-hydroxy-tert-butylphenyl)propane, bis(2-hydroxynaphthyl)-methane, 1,5-dihydroxynaphthalene, and phenolic novolaks. Further suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol, and 2,2-bis-(4-hydroxycyclohexyl)propane, and also neopentyl glycol.

The polyepoxide (P) may for example be prepared by reacting bisphenol A, a bisphenol A diglycidyl ether, and a polypropylene glycol glycidyl ether.

It is also possible to use polyglycidyl esters of polycarboxylic acids, such as oxalic acid, succinic acid, glutaric acid, terephthalic acid, 2,6-naphthalenedicarboxylic acid, dimerized linoleic acid, for example. Typical examples are glycidyl adipate and glycidyl phthalate.

Additionally suitable are hydantoin epoxides, epoxidized polybutadiene, and polyepoxide compounds obtained by epoxidizing an olefinically unsaturated aliphatic compound.

The polyepoxides (P) may optionally be modified. Modified polyepoxides are polyepoxides in which some of the reactive groups have been reacted with a modifying compound. One example is the modification of an epoxy resin with monophenol compounds or monothiol compounds. Other examples of modifying compounds include the following:
i) carboxyl-containing compounds such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of different chain lengths (e.g., adipic acid, sebacic acid, isophthalic acid or dimeric fatty acids), hydroxyalkylcarboxylic acids (e.g., lactic acid, dimethylolpropionic acid), and carboxyl-containing polyesters, or
ii) amino-containing compounds such as diethylamine or ethylhexylamine or diamines with secondary amino groups, e.g., N,N"-dialkylalkylenediamines such as dimethylethylenediamine, N,N"-dialkylpolyoxyalkyleneamines such as N,N"-dimethylpolyoxypropylenediamine, cyanoalkylated alkylenediamines such as bis-N,N"-cyanoethylethylenediamine, cyanoalkylated polyoxyalkyleneamines such as bis-N,N"-cyanoethylpolyoxypropylenediamine, polyaminoamides such as Versamides, especially amino-terminal reaction products of diamines (e.g., hexamethylenediamine), polycarboxylic acids, more particularly dimer fatty acids, and monocarboxylic acids, more particularly fatty acids, or the reaction product of one mole of diaminohexane with two moles of monoglycidyl ether or monoglycidyl ester, especially glycidyl esters of α-branched fatty acids such as of Versatic acid, or
iii) hydroxyl-containing compounds such as neopentyl glycol, bisethoxylated neopentyl glycol, neopentyl glycol hydroxypivalate, dimethylhydantoin-N,N"-diethanol, hexane-1,6-diol, hexane-2,5-diol; 1,4-bis(hydroxymethyl) cyclohexane, 1,1-isopropylidenebis(p-phenoxy)-2-propanol, trimethylolpropane, pentaerythritol or amino alcohols such as triethanolamine, methyldiethanolamine or hydroxyl-containing alkylketimines such as aminomethylpropane-1, 3-diol-methylisobutyl-ketimine or tris(hydroxymethyl)aminomethanecyclohexanoneketimine, and also polyglycol ethers, polyester polyols, polyether polyols, polycaprolactone polyols, polycaprolactam polyols of various functionalities and molecular weights, or
iv) saturated or unsaturated fatty acid methyl esters, which are reacted with hydroxyl groups of the epoxy resins in the presence of sodium methoxide.

For preparing the epoxide-amine adduct it is possible as amine component (N) to use primary and/or secondary amines and/or their salts, and/or salts of tertiary amines.

The amine ought preferably to be a water-soluble compound. Examples of such amines are mono- and dialkylamines, such as methylamine, ethylamine, propylamine, butylamine, dimethylamine, diethylamine, dipropylamine, methylbutylamine, and the like. Likewise suitable are alkanolamines, such as methylethanolamine, diethanolamine, and the like, and also aminoalkoxy alcohols, such as 2,2"-aminoethoxyethanol, for example. Suitability is possessed, further, by dialkylaminoalkylamines, such as dimethylaminoethylamine, diethylamino-propylamine, dimethylaminopropylamine, and the like. Used preferably are aminoalkoxy alcohols, such as 2,2"-aminoethoxyethanol, and also low molecular mass dialkylaminoalkylamines, such as N,N-dimethylaminopropylamine.

Polyamines with primary and/or secondary amino groups can be reacted in the form of their ketimines with the epoxide groups. The ketimines are prepared from the polyamines in a known way.

The amines (N) may also contain groups other than the amine groups as well, but such groups are not to disrupt the reaction of the amine with the epoxide group, and are also not to lead to gelling of the reaction mixture.

The epoxide-amine adduct can be obtained by the customary and known techniques, by reaction of at least one polyepoxide with at least one amine. The reaction can be carried out, for example, in an organic solvent.

In the aqueous coating composition (W) the epoxide-amine adduct takes the form of an aqueous dispersion. The aqueous dispersion is stabilized cationically. The charges needed for the epoxide-amine adduct to be water-dispersible can be generated by protonation with water-soluble acids or else by reaction of the oxirane groups with salts of a tertiary amine, as for example dimethylethanolamine, triethylamine, trimethylamine, triisopropylamine, and the like. The water-dispersibility of the epoxide-amine adduct is preferably increased through the addition of water-soluble acids. Suitable water-soluble acids are, for example, formic acid, acetic acid, propionic acid, valeric acid, boric acid, phosphoric acid, hypophosphorous acid or lactic acid. The aqueous dispersion of the epoxide-amine adduct can be prepared accordingly, for example, by converting some or all of the basic amino groups of the epoxide-amine adduct, by neutralization with an acid, into hydrophilic salt groups preceded or accompanied by dilution with water, and dispersion. It is preferred to use acetic acid. It is preferred to use phosphoric acid.

The aqueous coating composition (W) comprises preferably 1% to 60% by weight, more preferably 5% to 40% by weight, based on the overall aqueous coating composition (W), of the epoxide-amine adduct. For calculating the weight fraction of the epoxide-amine adduct in this case it is the epoxide-amine adduct per se that is used, prior to neutralization with an acid and prior to dispersion in aqueous solution—in other words, neither the neutralizing agent nor the remaining constituents of the dispersion of the epoxide-amine adduct are included in the calculation of the weight fraction of epoxide-amine adduct.

The aqueous coating composition (W) comprises either no crosslinking agent or else one or more nonblocked polyisocyanate crosslinking agents.

Crosslinking agents here are the customary and known crosslinking agents that are typically used for the crosslinking of epoxide-amine adducts, such as, more particularly, phenolic resins, amino resins (e.g., melamine resins, urea resins, benzoguanamine resins, glycoluril resins), and (blocked) polyisocyanates. By "no crosslinking agent" is meant that the aqueous coating composition (W) is free or substantially free from such crosslinking agents. There may at most be traces of such crosslinking agents present; however, "substantially free" means that the aqueous coating composition (W) contains less than 1.0% by weight of such crosslinking agents, based on the overall aqueous coating composition (W).

A polyisocyanate is a compound having two or more isocyanate groups. A nonblocked polyisocyanate is a polyisocyanate whose isocyanate groups are free. In contrast, a blocked polyisocyanate is one at least some of whose isocyanate groups are blocked in such a way that the blocking agent is eliminated only at elevated temperatures.

As stated above, then, the aqueous coating composition (W) is free or substantially free from blocked polyisocyanate crosslinking agents, and the constituents of the aqueous coating composition (W) are free or substantially free from blocked isocyanate groups. In contrast, the aqueous coating composition (W) may comprise one or more nonblocked polyisocyanate crosslinking agents.

The aqueous coating composition (W) preferably comprises one or more nonblocked polyisocyanate crosslinking agents.

Suitable nonblocked polyisocyanates are the customary and known nonblocked polyisocyanates, such as hexamethylene diisocyanate (HDI), isophorone diisocyanate (IPDI), 4,4"-diphenylmethane diisocyanate (MDI), and the isomers and homologs thereof, such as dimers (uretdiones) and trimers (isocyanurates), for example.

If the aqueous coating composition (W) does comprise one or more nonblocked polyisocyanate crosslinking agents, then the amount of nonblocked polyisocyanate(s) it comprises is preferably 1% to 30% by weight, more preferably 5% to 20% by weight, based in each case on the overall aqueous coating composition (W).

Besides the constituents described above, the aqueous coating composition (W) may comprise one or more further components. By way of example there may be one or more binders present that are different from epoxide-amine adducts, and/or there may be one or more pigments, dyes and/or auxiliaries and adjuvants present.

Suitable pigments are the inorganic and organic pigments that are typically used in coating compositions, these being, for example, white pigments (e.g., titanium dioxide, zinc oxide, zinc sulfide, barium sulfate), black pigments (e.g., carbon black, spinel black, black organic pigments), inorganic chromatic pigments (e.g., iron oxides, chromium oxides, mixed-phase pigments, lead chromate, lead molybdate, bismuth vanadate, ferrocyan blue, ultramarine, spinels), organic chromatic pigments (e.g., azo pigments, metal core pigments, triphenylmethane pigments, indigoid pigments, isoindolines, isoindolinones, anthraquinones, quinacridones, perylene, diketopyrrolopyrrole, pyrazolequinazolones, quinophthalones, dioxazines), effect pigments (e.g., interference pigments, metallic effect pigments), anticorrosion pigments (e.g., zinc phosphate, chromium phosphate, zinc/aluminum phosphate, zinc powders).

Preference is given to using the pigments that are customary in primers, primer-surfacers, and fillers for metallic coatings. These include more particularly titanium dioxide, zinc oxide, zinc phosphate, iron oxides, and carbon black.

Suitable auxiliaries and adjuvants are the auxiliaries and adjuvants that are typically used in coating compositions, such as, for example, fillers (e.g., silicates such as talc, kaolin, mica or other calcium silicates, aluminum silicates and/or sodium silicates; carbonates such as chalk, calcite, marble, dolomite, and precipitated calcium carbonates; sulfates such as natural (barytes, heavy spar) or synthetic (blanc fixe) barium sulfate, silicas such as Aerosil); plasticizers, surfactants/emulsifiers, dyes, dispersants, wetting agents, flow control agents, defoamers, deaerating agents, rheological assistants, flame retardants, light stabilizers such as UV absorbers, free-radical scavengers, preservatives, and water repellents.

It is preferred to use the auxiliaries and/or adjuvants that are customary in primers, primer-surfacers, and fillers for metallic coatings. These include more particularly fillers such as silicas, talc, kaolin, aluminum silicates, barium sulfate, and chalk.

The aqueous coating composition (W) may in particular also comprise phosphoric acid. The aqueous coating composition (W) preferably comprises phosphoric acid at 0.1% to 4.0% by weight, more preferably 0.5% to 2.5% by weight, based on the overall aqueous coating composition (W).

The aqueous coating composition (W) may be applied to the metallic or plastics substrate by means of customary and commonplace application methods, as for example by spraying, including electrostatically assisted spraying, knifing, roller coating, dipping, spreading, rolling, or pouring. The aqueous coating composition (W) is applied to the substrate preferably by means of spraying, including electrostatically assisted spraying. In these techniques, fine droplets of the aqueous coating composition (W) are generated, and are deposited on the substrate. In the case of spraying, the aqueous coating composition (W) is atomized by means of compressed air and/or by high pressure in the airless method and/or by centrifugal forces (high-speed rotary atomization). In the case of electrostatically assisted spraying, the aqueous coating composition (W) is atomized by means of electrostatic forces.

If desired, before or after the aqueous coating composition (W) is cured on the substrate, one or more further coating compositions may be applied to the applied film of the aqueous coating composition (W). Such compositions may include, for example, fillers, basecoats and/or clearcoats. Those suitable are, for example, the fillers, basecoats, and clearcoats that are customary for coating metals or plastics. Examples of preferred fillers are two-component polyurethane fillers. Examples of preferred basecoats are aqueous basecoats. Examples of preferred clearcoats are two-component polyurethane clearcoats. Generally speaking, preference is given to those fillers, basecoats and/or clearcoats that have a low VOC value.

The uncured film of the aqueous coating composition (W) may be subjected to flashing and/or preliminary drying before one or more further films are applied. For example, preliminary drying of the uncured film of the aqueous coating composition (W) may take place at room temperature for 5 to 60 minutes, before a further film is applied. The film of the aqueous coating composition (W) and the at least one further film may then be jointly cured. Alternatively, the film of the aqueous coating composition (W) may also be cured first on the substrate, before any further films are applied and then are cured separately from (W).

The further coating composition(s) may be applied by means of customary and commonplace application methods to the metallic or plastics substrate, by means of spraying, including electrostatically assisted spraying, knifing, roller coating, dipping, spreading, rolling or pouring, for example. The further coating compositions are preferably applied by means of spraying, including electrostatically assisted spraying.

The aqueous coating composition (W) may be used, for example, as a primer, primer-surfacer or filler. A primer is a coating which is located directly on the untreated or pretreated metallic or plastics substrate or the existing paint finish, and has a dry film thickness of not more than 30 µm. Primers are generally distinguished by good adhesion and corrosion control properties. A filler is a coating which is located directly on the untreated or pretreated metallic or plastics substrate, or the existing paint finish, or else on a primer applied beforehand, and comprises a customary fraction of fillers, and has a dry film thickness of 30-300 µm. Fillers are generally distinguished by effective masking of substrate unevennesses, and stonechip resistance, and also good and rapid sandability (in the case of sanding fillers). The filler need not necessarily be sanded (wet-on-wet filler, non-sanding filler). A primer-surfacer combines the properties of primer and filler. It may be applied either directly to the untreated or pretreated metallic or plastics substrate, or the existing paint finish, or to a primer applied beforehand, and is applied in a dry film thickness of up to 300 µm and is notable generally for good adhesion and corrosion control properties, good sandability (in the case of sanding primer-surfacers), and stonechip resistance.

If the aqueous coating composition (W) is used as primer, then the aqueous coating composition (W) is applied preferably in a dry film thickness of 5-30 µm, more preferably of 10-20 µm, to the substrate. After flashing for 10-40 minutes at room temperature, for example, a filler is preferably applied "wet-on-wet" to the uncured primer. Primer and filler are then cured preferably jointly.

If the aqueous coating composition (W) is used as a primer or primer-surfacer, it preferably comprises phosphoric acid as a further component. The amount of phosphoric acid in this case is preferably 0.1% to 4.0% by weight, more preferably 0.5% to 2.5% by weight, based in each case on the overall aqueous coating composition (W).

If the aqueous coating composition (W) is used as a filler or primer-surfacer, then the aqueous coating composition (W) is applied preferably in a dry film thickness of 20-200 µm, more preferably of 40-100 µm, to the substrate. Preferably the filler or primer-surfacer is flashed, cured, and—optionally—further treated (e.g., sanded), before any further films, such as basecoat and/or clearcoat, for example, are applied. It is, however, also possible to apply a further coating composition to the filler or primer-surfacer—for example, a basecoat—without prior curing or sanding (wet-on-wet filler, non-sanding filler).

If no further coating composition is applied to a primer-surfacer of this kind, then the primer-surfacer forms the topmost layer of the resulting coating and hence functions as a topcoat. In this way it is possible, for example, to apply a topcoat directly onto the metallic substrate.

Transparent finishes for specialty applications, such as the protection of aluminum wheel rims, for example, are possible in this way as well. They may if desired be coated further with a clearcoat.

If the aqueous coating composition (W) is used as a filler, primer-surfacer and/or topcoat, then it preferably comprises at least one nonblocked polyisocyanate crosslinking agent. In this case the at least one polyisocyanate is not added to the aqueous coating composition (W) until shortly before application.

The aqueous coating composition (W) may be used as a primer, primer-surfacer, filler, basecoat or topcoat. Through the addition of corresponding pigments it is possible, as well as transparent coatings, to obtain white, black or other-colored coatings as well. For example, the aqueous coating composition (W) may also be used as a white, black, other-colored or transparent primer-surfacer, basecoat and/or topcoat, and also as a metallic-effect primer-surfacer, basecoat and/or topcoat.

The aqueous coating composition (W) may be cured physically and/or chemically. By physical curing is meant drying of the coating composition, this drying being governed by the evaporation of water and, where appropriate, of other volatile constituents of the coating composition. In the case of chemical curing, in contrast, chemical crosslinking reactions take place between the constituents of the coating composition. If the aqueous coating composition (W) contains no crosslinking agent, then curing may take place physically. If the aqueous coating composition (W) contains at least one nonblocked polyisocyanate crosslinking agent, then curing may take place chemically.

It is essential to the invention that the curing of the aqueous coating composition (W) can and does take place at temperatures of below 90° C. This makes it possible in particular to use the system for automotive refinish, where relatively high temperatures must not be employed, in order to prevent damage to the vehicle. In accordance with the method described, complete or substantially complete curing of the aqueous coating composition (W) can be achieved even at temperatures of below 90° C. By "substantially complete" is meant that the curing of the aqueous coating composition (W) is very largely concluded after curing at a temperature of less than 90° C.

The aqueous coating composition (W) can in principle also be cured at temperatures of 90° C. and above. In the method of the invention, however, the aqueous coating composition (W) is cured at temperatures of below 90° C. Curing of the aqueous coating composition (W) takes place preferably at temperatures of below 80° C., even more preferably at temperatures of below 70° C., and with particular preference at temperatures of 60° C. or below. Curing may take place in accordance with the customary and known methods, as for example in a suitable drying booth, and/or assisted by radiant infrared lamps. It is possible with preference to carry out curing for a duration of 2 hours or less at a temperature of 60-70° C., more preferably at 50-70° C. for 20-40 minutes.

The aqueous coating composition (W) preferably has a solids of 5% to 80%, more preferably of 20% to 70%, and very preferably of 30% to 60%, by weight, based in each case on the overall aqueous coating composition (W). The solids is determined in accordance with DIN EN ISO 3251:2008 for an initial mass of 1.0 g after drying at 80° C. for 120 minutes.

Also found has been a coating which is obtainable by the method described above. Preferred embodiments of the coating may be obtained in accordance with those embodiments of the method that have been identified above as being preferred.

Additionally found has been a substrate coated with a coating obtainable by the method described above. Preferred embodiments of the substrate can be obtained in accordance with those embodiments of the method that have been identified above as being preferred.

Also found has been an aqueous, two-component coating composition whose constituents are free or substantially free from blocked isocyanate groups, and which comprises a component (A), which comprises an aqueous dispersion of an epoxide-amine adduct, and a component (B), component (B) comprising at least one nonblocked polyisocyanate crosslinking agent. A two-component coating composition is a coating composition which comprises two or more components, which are stored separately from one another and are not mixed with one another until shortly before the application. Regarding the definition of the individual constituents of the components, the elucidation given in the above description of the method applies.

The method described above requires only low curing temperatures and is therefore suitable especially for automotive refinish. It can also be used, however, for other purposes, such as the industrial coating of metal sheets for various objectives, for example. Given that an aqueous coating composition is employed, the required amounts of organic solvents can, advantageously, be reduced sharply, and so even strict environmental legislation on solvent emission can be observed. At the same time, sufficient corrosion control, effective adhesion to the substrate, and good intercoat adhesion to further coating films, and also good stonechip resistance on the part of the coating, can be achieved. The combination of these features (low curing temperature, low organic solvent content, and good corrosion control, adhesion, and stonechip resistance properties on the part of the resultant coating) have not been hitherto achievable by means of the methods of the prior art.

In the text below, the invention is illustrated in more detail by examples, without being confined thereto.

EXAMPLES

The quantity figures are in parts by weight unless indicated otherwise.

1. Primers, Primer-Surfacers or Fillers in Multicoat Systems with Additional Basecoat and Clearcoat Mixture 1 was prepared by mixing the constituents according to table 1 in a dissolver for 15 minutes and then dispersing the mixture in a stirred mill for 30 minutes.

TABLE 1

|  | Mixture 1 |
| --- | --- |
| Epoxide-amine adduct (I), 63% in butyl glycol/water/glacial acetic acid | 24.2 |
| DI water | 29.8 |
| Phosphoric acid, 8.5% in water | 2.0 |
| Aerosil R 972 | 1.0 |
| Blanc Fixe powder N | 10.8 |
| Titanium dioxide (Tiona 595) | 10.0 |
| Talc (Luzenac 10 MO) | 8.0 |
| Zinc phosphate (PZ 10) | 6.0 |
| Bayferrox 3910 | 3.0 |
| Bayferrox 130 BM | 0.1 |
| Lamp black (Flamm 101) | 0.1 |
| Butyl glycol | 5 |

The epoxide-amine adduct (I) in table 1 is the reaction product prepared in example 3 (epoxide-amine adduct, 63% in butyl glycol/water/glacial acetic acid).

Adjustment of Filler/Primer-Surfacer/Primer before Spray Application

Before spray application, 100 parts of mixture 1 were admixed with an additional 15 parts of dilute phosphoric acid (8.5% in DI water), as indicated in table 2. This gave mixture 2.

TABLE 2

|  | Mixture 2 |
| --- | --- |
| Mixture 1 | 100 |
| Phosphoric acid, 8.5% | 15 |

Subsequently, 115 parts of mixture 2 were mixed with 10 parts of a polyisocyanate curing agent (SC20-030F, hexamethylene diisocyanate trimer, 78% in butyl acetate/xylene) and then adjusted with 12.5 parts of DI water to spray viscosity (65 sec. ISO 4/EN ISO 2431).

The resulting mixture was used as a primer, as a primer-surfacer, as a wet-on-wet filler, and as a sanding filler, as described below.

1.1 Application as a Primer in Combination with a Conventional Sanding Filler

The primer was applied in each case to substrates of aluminum, steel, and galvanized steel, and to plastic (GRP). Prior to application, the substrates were sanded and cleaned. Application was made by spraying in a dry film thickness of approximately 10 µm. The layer was flashed off on the substrate at room temperature for 30 minutes, and then a 2K [2-component] polyurethane filler was applied in a film thickness of approximately 60 µm. Primer and filler were cured jointly at 60° C. for 30 minutes.

After the cured filler surface had been sanded, a commercial aqueous basecoat was applied in a film thickness of approximately 10 µm. After a 20-minute flash-off time, a commercial 2K polyurethane clearcoat was applied thereto "wet-on-wet" in a film thickness of approximately 60 µm. Aqueous basecoat and clearcoat were cured jointly at 60° C. for 30 minutes.

1.2 Application as a Primer-Surfacer

The primer-surfacer was applied in each case to substrates of aluminum, steel, and galvanized steel, and to plastic (GRP). Prior to application, the substrates were sanded and cleaned. Application was made by spraying in a dry film thickness of approximately 60 μm. The layer was flashed off on the substrate at room temperature for 30 minutes and cured at 60° C. for 30 minutes. After cooling had taken place, the primer-surfacer was sanded, and a commercial aqueous basecoat was applied in a film thickness of approximately 10 μm. After a 20-minute flash-off time, a commercial 2K polyurethane clearcoat was applied thereto "wet-on-wet" in a film thickness of approximately 60 μm. Aqueous basecoat and clearcoat were cured jointly at 60° C. for 30 minutes.

1.3 Application as a Wet-On-Wet (Non-Sanding) Filler

The aqueous filler was applied to a cathodically electrocoated steel panel (roughened by abrasion, and cleaned) in a dry film thickness of approximately 40 μm. After a 30-minute flash-off time at room temperature and subsequent curing at 60° C. for 30 minutes, a commercial aqueous basecoat was applied in a film thickness of approximately 10 μm and, after a 20-minute flash-off time, a commercial 2K polyurethane clearcoat was applied thereto "wet-on-wet" in a film thickness of approximately 60 μm. The system was cured at 60° C. for 30 minutes.

1.4 Application as a Sanding Filler

The aqueous filler was applied to a cathodically electrocoated steel panel (roughened by abrasion, and cleaned) in a dry film thickness of approximately 60 μm. After a 30-minute flash-off time at room temperature, the filler was cured in an oven at 60° C. for 30 minutes. After it had cooled, the filler was sanded using commercial sandpaper. After subsequent cleaning, a commercial aqueous basecoat was applied in a film thickness of approximately 10 μm, and, after a 20-minute flash-off time, a commercial 2K polyurethane clearcoat was applied thereto "wet-on-wet" in a film thickness of approximately 60 μm. Aqueous basecoat and clearcoat were cured jointly at 60° C. for 30 minutes.

The properties of the resultant coatings were tested after aging for 7 days at room temperature as follows.

All Substrates
  Adhesion test using the cross-cut instrument (DIN EN ISO 2409) and subsequent tape removal (Tesaband from Beiersdorf, Tesa 4651)
  MB scratch sample (PBO DC 371)
  Stonechip test (DIN 55996-1)

The codes indicated are defined as follows:
Code 0=excellent
Code 1=very good
Code 2=good.

TABLE 3

| System | Cross-cut | Scratch sample | Stonechip |
|---|---|---|---|
| 1.1 on steel | code 0 | code 1 | code 2 |
| 1.1 on galvanized steel | code 0 | code 1 | code 2 |
| 1.1 on aluminum | code 0 | code 1 | code 2 |
| 1.1 on plastic | code 0 | code 1 | code 2 |
| 1.2 on steel | code 0 | code 0 | code 1.5 |
| 1.2 on galvanized steel | code 0 | code 0 | code 1.5 |
| 1.2 on aluminum | code 0 | code 0 | code 1.5 |
| 1.2 on plastic | code 0 | code 1 | code 1.5 |
| 1.3 on cathodic electrocoat | code 0 | code 0 | code 1.5 |
| 1.4 on cathodic electrocoat | code 0 | code 0 | code 1.5 |

The results in table 3 show that the coatings according to 1.1, 1.2, 1.3, and 1.4 exhibit excellent adhesion on different substrates, even in the scratch sample, and good stonechip resistance.

Additionally determined were the corrosion control effect on steel, on galvanized steel, and on aluminum of the resultant coatings from 1.1 and 1.2 after aging for 7 days at room temperature, by means of the DIN 50021 salt spray test (480 h; for steel and galvanized steel: pH 6.5-7.2; for aluminum: pH 3.1-3.3). The sample panels for this purpose were scored with an Erichsen scorer, type 463. The results of the corrosion control tests are shown in table 4 in the form of the visible subfilm migration at the scoring mark [mm].

TABLE 4

|  | Aluminum | Galvanized steel | Steel |
|---|---|---|---|
| Coatings 1.1 | 0.4 | 1.8 | 2.5 |
| Coatings 1.2 | 0 | 2.2 | 3.0 |

The results in table 4 show that the coatings of systems 1.1 and 1.2 im part very good corrosion control to all three substrates.

2. Basecoats, Topcoats 2.1 Color RAL 9010 (White)

Mixture W1 was prepared by mixing the constituents according to table 5 in a dissolver for 15 minutes and then dispersing the mixture in a stirred mill for 45 minutes.

TABLE 5

|  | Mixture W1 |
|---|---|
| Epoxide-amine adduct (I), 63% in butyl glycol/water/glacial acetic acid | 25 |
| DI water | 25 |
| Phosphoric acid, 8.5% in water | 4 |
| Aerosil R 972 | 0.7 |
| Titanium dioxide (Tiona 595) | 20.0 |
| Bayferrox 3920 | 0.06 |
| Lamp black (Flamm 101) | 0.001 |
| Blanc Fixe powder N | 12.939 |
| Zinc phosphate (PZ 20) | 6.0 |
| Butyl glycol | 5 |
| Tinuvin 5941 R | 1 |
| Byk 331 | 0.3 |

The epoxide-amine adduct (I) in table 5 is the reaction product prepared in example 3 (epoxide-amine adduct, 63% in butyl glycol/water/glacial acetic acid).

Prior to spray application, 100 parts of mixture W1 were admixed with a further 10 parts of dilute phosphoric acid (8.5% in DI water), as indicated in table 6. This gave mixture W2.

TABLE 6

|  | Mixture W2 |
|---|---|
| Mixture W1 | 100 |
| Phosphoric acid, 8.5% | 10 |

Then 110 parts of mixture W2 were mixed with 20 parts of a polyisocyanate curing agent (Desmodur N 3600, hexamethylene diisocyanate trimer, 78%) and then adjusted to spray viscosity with 15 parts of DI water (20 sec. ISO 4/EN ISO 2431).

The characteristics of the resulting mixture were as follows:

| | |
|---|---|
| nonvolatiles content (solids) | 49.4% by weight |
| VOC | 285 g/L |
| pH | 5.0 |

The resulting mixture was used
1.) as a white primer-surfacer without further coat system (i.e. as a white topcoat) and
2.) as a white primer-surfacer beneath a clearcoat as described below.
  Substrates: aluminum, steel, galvanized steel, in each case sanded and cleaned
  System 1.) 2 spray passes with 5-minute flash-off in between, film thickness
    approximately 50-60 μm,
    curing at 60° C. for 30 minutes
  System 2.) 2 spray passes with 5-minute flash-off in between, film thickness
    approximately 50-60 μm,
    curing at 60° C. for 30 minutes
    coating with commercial 2K clearcoat
    curing at 60° C. for 30 minutes The resulting systems (coatings) showed good processing properties, good adhesion, and good stonechip protection on all three substrates.

2.2 Clearcoat

Mixture K1 was prepared by mixing the constituents according to table 7 in a dissolver for 10 minutes.

TABLE 7

| | Mixture K1 |
|---|---|
| Epoxide-amine adduct (I), 63% in butyl glycol/water/glacial acetic acid | 44 |
| DI water | 47.6 |
| Phosphoric acid, 8.5% in water | 2.5 |
| Butyl glycol | 4.6 |
| Tinuvin 59-41 R | 1 |
| Byk 331 | 0.3 |

The epoxide-amine adduct (I) in table 7 is the reaction product prepared in example 3 (epoxide-amine adduct, 63% in butyl glycol/water/glacial acetic acid).

Prior to spray application, 100 parts of mixture K1 were admixed with a further 10 parts of dilute phosphoric acid (8.5% in DI water), as indicated in table 8. This gave mixture K2.

TABLE 8

| | Mixture K2 |
|---|---|
| Mixture K1 | 100 |
| Phosphoric acid, 8.5% | 10 |

Then 110 parts of mixture K2 were mixed with 20 parts of a polyisocyanate curing agent (Desmodur N 3600, hexamethylene diisocyanate trimer, 78%) and then adjusted to spray viscosity with 12 parts of DI water (20 sec. ISO 4/EN ISO 2431).

The characteristics of the resulting mixture were as follows:

| | |
|---|---|
| nonvolatiles content (solids) | 31% by weight |
| VOC | 290 g/L |
| pH | 5.0 |

The resulting mixture was used
1.) as a clear primer-surfacer without further coat system (i.e. as a clear topcoat) and
2.) as a clear primer-surfacer beneath a clearcoat as described below.
  Substrates: aluminum, steel, galvanized steel, in each case sanded and cleaned
  System 1.) 2 spray passes with 5-minute flash-off in between, film thickness
    approximately 30-40 μm,
    curing at 60° C. for 30 minutes
  System 2.) 2 spray passes with 5-minute flash-off in between, film thickness
    approximately 30-40 μm,
    curing at 60° C. for 30 minutes
    coating with commercial 2K clearcoat
    curing at 60° C. for 30 minutes The resulting systems (coatings) showed very good adhesion on all three substrates.

2.3 Silver Metallic Color

Mixture M1 was prepared by mixing the constituents according to table 9 in a dissolver for 10 minutes.

TABLE 9

| | Mixture M1 |
|---|---|
| Epoxide-amine adduct (I), 63% in butyl glycol/water/glacial acetic acid | 39 |
| Phosphoric acid, 8.5% in water | 2.5 |
| Tinuvin 59-41 R | 1 |
| Byk 331 | 0.3 |
| Butyl glycol | 4.6 |
| Alu Stapa Hydrolux 8154, 65% | 10 |

The epoxide-amine adduct (I) in table 9 is the reaction product prepared in example 3 (epoxide-amine adduct, 63% in butyl glycol/water/glacial acetic acid).

With stirring, 42.6 parts of DI water were added to mixture M1. The 100 parts of the resultant mixture were admixed with 10 parts of dilute phosphoric acid (8.5% in DI water). This gave mixture M2.

Then 110 parts of mixture M2 were mixed with 20 parts of a polyisocyanate curing agent (Desmodur N 3600, hexamethylene diisocyanate trimer, 78%) and then adjusted to spray viscosity with 12 parts of DI water (20 sec. ISO 4/EN ISO 2431).

The resulting mixture was used
1.) as a metallic coating without further coat system (i.e. as a metallic topcoat) and
2.) as a metallic coating beneath a clearcoat as described below.
  Substrates: aluminum, steel, galvanized steel, in each case sanded and cleaned
  System 1.) 2 spray passes with 5-minute flash-off in between, and 1 misting pass
    for effect alignment, film thickness approximately 30-40 μm,
    curing at 60° C. for 30 minutes
  System 2.) 2 spray passes with 5-minute flash-off in between, and 1 misting pass
    for effect alignment, film thickness approximately 30-40 μm, curing at 60° C. for 30 minutes
coating with commercial 2K clearcoat
curing at 60° C. for 30 minutes The metallic coating had excellent processing properties. In particular, the spray mist assimilation, the substrate wetting, and the flow were excellent.

The resultant systems (coatings) showed a good metallic effect, good adhesion, and good stonechip protection on all three substrates.

2.4 Color VWL Y 3D (Tornado Red)

Mixture R1 was prepared by mixing the constituents according to table 10 in a dissolver for 15 minutes and then dispersing the mixture in a stirred mill for 120 minutes.

TABLE 10

|  | Mixture R1 |
| --- | --- |
| Epoxide-amine adduct (I), 63% in butyl glycol/water/glacial acetic acid | 27.29 |
| DI water | 30 |
| Phosphoric acid, 8.5% in water | 5 |
| Butyl glycol | 5 |
| Irgazin DPP red BO | 9 |
| Quindo violet RV 6902/R | 1.6 |
| Chromophtal red A2B | 0.8 |
| Novoperm orange HL-70 | 0.8 |
| Color black FW-2 | 0.01 |
| Titanium rutile 2310 | 0.8 |
| Aerosil R 972 | 0.7 |
| Blanc Fixe powder N | 13 |
| Zinc phosphate (PZ 20) | 6.0 |

The epoxide-amine adduct (I) in table 10 is the reaction product prepared in example 3 (epoxide-amine adduct, 63% in butyl glycol/water/glacial acetic acid).

Prior to spray application, 100 parts of mixture R1 were admixed with a further 10 parts of dilute phosphoric acid (8.5% in DI water), as indicated in table 11. This gave mixture R2.

TABLE 11

|  | Mixture R2 |
| --- | --- |
| Mixture R1 | 100 |
| Phosphoric acid, 8.5% | 10 |

Then 110 parts of mixture R2 were mixed with 20 parts of a polyisocyanate curing agent (Desmodur N 3600, hexamethylene diisocyanate trimer, 78%) and then adjusted to spray viscosity with 15 parts of DI water (20 sec. ISO 4/EN ISO 2431).

The resulting mixture was used
1.) as a tornado red primer-surfacer without further coat system (i.e. as a tornado red topcoat) and
2.) as a tornado red primer-surfacer beneath a clearcoat as described below.
  Substrates: aluminum, steel, galvanized steel,
    in each case sanded and cleaned
  System 1.) 2 spray passes with 5-minute flash-off in between, film thickness
    approximately 50-60 μm,
    curing at 60° C. for 30 minutes
  System 2.) 2 spray passes with 5-minute flash-off in between, film thickness
    approximately 50-60 μm,
    curing at 60° C. for 30 minutes
    coating with commercial 2K clearcoat
    curing at 60° C. for 30 minutes The resulting systems (coatings) showed good adhesion, and good stonechip protection on all three substrates.

2.5 Basecoat Color VWL Y 3D (Tornado Red)

Mixture B1 was prepared by mixing the constituents according to table 12 in a dissolver for 15 minutes and then dispersing the mixture in a stirred mill for 120 minutes.

TABLE 12

|  | Mixture B1 |
| --- | --- |
| Epoxide-amine adduct (I), 63% in butyl glycol/water/glacial acetic acid | 36.89 |
| DI water | 39.8 |
| Acetic acid, 10% in water | 2.9 |
| Butyl glycol | 7.4 |
| Irgazin DPP red BO | 9 |
| Quindo violet RV 6902/R | 1.6 |
| Chromophtal red A2B | 0.8 |
| Novoperm orange HL-70 | 0.8 |
| Color black FW-2 | 0.01 |
| Titanium rutile 2310 | 0.8 |

The epoxide-amine adduct (I) in table 12 is the reaction product prepared in example 3 (epoxide-amine adduct, 63% in butyl glycol/water/glacial acetic acid).

100 parts of mixture B1 were mixed with 20 parts of a polyisocyanate curing agent (Desmodur N 3600, hexamethylene diisocyanate trimer, 78%) and then adjusted to spray viscosity with 20 parts of DI water (20 sec. ISO 4/EN ISO 2431).

The resulting mixture was used as a tornado red basecoat atop a primer-surfacer and beneath a clearcoat.
  Substrates: aluminum, steel, galvanized steel,
    in each case sanded and cleaned
  System: 2 spray passes of white primer-surfacer from example 2.1 with 5-minute
    flash-off in between, film thickness approximately
      50-60 μm,
    curing at 60° C. for 30 minutes,
    2 spray passes of tornado red basecoat with 5-minute flash-off in
    between, film thickness approximately 30 μm,
    after approximately 30 minutes at room temperature, coating with
    commercial 2K clearcoat, film thickness approximately
      60 μm
    curing at 60° C. for 30 minutes The resulting systems (coatings) showed good adhesion, and good stonechip protection on all three substrates.

3. Preparation of the Epoxide-Amine Adduct (I)

In a reactor equipped with a stirrer, reflux condenser, internal thermometer, and inert-gas inlet, 1099.2 parts of epoxide resin based on bisphenol A, with an epoxy equivalent weight (EEW) of 186 g/eq, are heated, together with 336.9 parts of bisphenol A, 193.6 parts of dodecylphenol, and 84.1 parts of xylene, to 125° C. under a nitrogen atmosphere, and stirred for 10 minutes. Heating then takes place to 130° C. and 1.6 parts of triphenylphosphine (from BASF SE) are added. After a brief exotherm to 150° C., the reaction mixture is held at 130° C. until the EEW has reached a value of 738 g/eq.

At that point 412.7 parts of butyl glycol and 997.3 parts of a polypropylene glycol glycidyl ether having an EEW of 392 (Araldit DY 3601; Huntsman) are added and the temperature is allowed to drop to 90° C.

At 90° C., 165.5 parts of 2,2"-aminoethoxyethanol (from BASF SE) and, 10 minutes later, 40 parts of N,N-dimethylaminopropylamine (from BASF SE) are added. An exothermic reaction occurs and the temperature climbs to 120° C. It is then held at 110° C. for 2 hours until the viscosity remains constant at 359 mPas (85% resin solution, diluted with propylene glycol methyl ether to 45%; measured on Brookfield CAP 2000 viscometer at 23° C.). The resin solution is then cooled to 80° C. and discharged.

2946.8 parts of the resin solution are transferred to a dispersing vessel, into which 573.1 parts of deionized water, 462.2 parts of butyl glycol and 17.9 parts of glacial acetic acid have been introduced. The mixture is stirred and homogenized for an hour and then the resin solution is allowed to cool to room temperature. This produces a semitransparent whitish solution possessing the following characteristics:

| Solids content: | 63.3% | (1 h at 130° C., initial mass 1.0 g) |
|---|---|---|
| Base content: | 0.79 | milliequivalents/g solids |
| Acid content: | 0.11 | milliequivalents/g solids |
| pH: | 7.6 | |
| Conductivity: | 0.33 mS | (as 10% strength aqueous solution) |
| Hydroxyl number: | 138.5 | mg KOH/g |

What is claimed is:

1. A method for coating an uncoated or precoated metallic or plastic substrate, comprising:
    (a) applying an aqueous coating composition (W) to the substrate, wherein constituents of the aqueous coating composition are free or substantially free of blocked isocyanate groups, the aqueous coating composition (W) comprising i) a cationically stabilized aqueous dispersion of an epoxide-amine adduct which is the reaction product of at least one polyepoxide and at least one amine, wherein the aqueous coating composition (W) comprises 1% to 60% by weight, based on the overall aqueous coating composition (W), of the epoxide-amine adduct, and ii) one or more nonblocked polyisocyanate crosslinking agents, wherein no crosslinking agent other than the one or more nonblocked polyisocyanate crosslinking agents is present in coating composition (W), and;
    (b) applying one or more further coating compositions; and
    (c) completely thermally curing the coating composition (W) and, where appropriate, the further coating composition(s), at temperatures of below 90° C.

2. The method of claim 1, wherein said curing takes place at temperatures of below 70° C.

3. The method of claim 1, wherein the aqueous coating composition comprises 1% to 30% by weight, based on the overall aqueous coating composition (W), of the one or more nonblocked polyisocyanates.

4. The method of claim 1, wherein the aqueous coating composition (W) comprises 5% to 40% by weight, based on the overall aqueous coating composition (W), of the epoxide-amine adduct.

5. The method of claim 1, wherein the aqueous dispersion is cationically stabilized by 0.1% to 4.0% by weight, based on the overall aqueous coating composition (W), of phosphoric acid.

6. The method of claim 1, wherein the fraction of organic solvents in the aqueous coating composition (W) is less than 30%, by weight, based on the overall aqueous coating composition (W).

7. The method of claim 1, wherein the aqueous coating composition (W) is applied to the substrate by spraying.

8. The method of claim 7, wherein the spraying step comprises electrostatically assisted spraying.

9. The method of claim 1, wherein the substrate comprises an uncoated or precoated metallic substrate made of aluminum, steel, or galvanized steel.

10. The method of claim 1, wherein the substrate is part of an automobile body.

11. The method of claim 1, wherein the substrate has an existing paint finish.

12. The method of claim 1, wherein the coating composition (W) and the further coating composition(s) are completely thermally cured at temperatures of below 90° C.

13. The method of claim 1, wherein the at least one amine is selected from the group consisting of alkanolamines, aminoalkoxy alcohols and dialkylaminoalkylamines.

14. The method of claim 13, wherein the at least one amine is an aminoalkoxy alcohol.

15. A method for providing corrosion control to an uncoated or precoated metallic substrate, comprising:
    (a) applying an aqueous coating composition (W) to the substrate, wherein constituents of the aqueous coating composition are free or substantially free of blocked isocyanate groups, the aqueous coating composition (W) comprising i) a cationically stabilized aqueous dispersion of an epoxide-amine adduct which is the reaction product of at least one polyepoxide and at least one amine, wherein the aqueous coating composition (W) comprises 1% to 60% by weight, based on the overall aqueous coating composition (W), of the epoxide-amine adduct, and ii) one or more nonblocked polyisocyanate crosslinking agents, wherein no crosslinking agent other than the one or more nonblocked polyisocyanate crosslinking agents is present in coating composition (W), and;
    (b) applying one or more further coating compositions; and
    (c) completely thermally curing the coating composition (W) and, where appropriate, the further coating composition(s), at temperatures of below 90° C.

* * * * *